(12) United States Patent
Chen

(10) Patent No.: US 6,983,786 B2
(45) Date of Patent: Jan. 10, 2006

(54) HEIGHT-ADJUSTABLE CAR CURTAIN

(76) Inventor: Ing-Wen Chen, No.23, Lane 207,Kao-Feng Road, Hsin-Chu (TW)

(*) Notice: Subject to any disclaimer, the term of this patent is extended or adjusted under 35 U.S.C. 154(b) by 16 days.

(21) Appl. No.: 10/671,039

(22) Filed: Sep. 24, 2003

(65) Prior Publication Data

US 2005/0061454 A1    Mar. 24, 2005

(51) Int. Cl.
*B60J 3/02* (2006.01)
(52) U.S. Cl. .................. 160/370.22; 296/97.8
(58) Field of Classification Search .......... 160/370.22, 160/370.21, 370.23, 265, 266, 238, 66; 296/97.8, 296/97.7, 97.4
See application file for complete search history.

(56) References Cited

U.S. PATENT DOCUMENTS

| | | | | |
|---|---|---|---|---|
| 3,009,166 A | * | 11/1961 | Sears | 4/494 |
| 3,116,097 A | * | 12/1963 | Novales | 312/297 |
| 5,560,668 A | * | 10/1996 | Li | 296/97.8 |
| 5,638,884 A | * | 6/1997 | Lin | 160/370.22 |
| 5,964,270 A | * | 10/1999 | Kirkey et al. | 160/273.1 |
| 6,186,587 B1 | * | 2/2001 | Entenmann | 296/214 |
| 6,427,751 B1 | * | 8/2002 | Schlecht et al. | 160/370.22 |
| 6,491,332 B2 | * | 12/2002 | De Ceuster | 296/37.16 |
| 6,508,292 B1 | * | 1/2003 | Saperas | 160/42 |
| 6,682,133 B2 | * | 1/2004 | Glasl | 296/216.01 |
| 2001/0017194 A1 | * | 8/2001 | Schlecht et al. | 160/370.22 |
| 2004/0182024 A1 | * | 9/2004 | Varley et al. | 52/243.1 |

* cited by examiner

Primary Examiner—David Purol
(74) Attorney, Agent, or Firm—Pro-Techtor Int'l Services

(57) ABSTRACT

A height-adjustable car curtain, mainly characterized by having a case, roughly shaped like a tube with two ends to which connecting elements are attached, connecting to guiding rails at adjustable angles. The guiding rails allow to be cut to suitable lengths. Therefore, car windows of various sizes are readily adapted to. Furthermore, a winding device is provided for winding and unwinding a cord, causing a curtain to be unfolded and folded. The winding device has a control system with a lever arm and a contact switch for switching off a motor upon the cord becoming slack, thus preventing the cord from becoming tangled. Lastly, a directly or remotely operated control circuit is provided, controlling operation of a motor of the winding device, in particular causing the motor to stop and reverse direction if the unfolding or folding curtain encounters an obstacle, preventing damaging of the motor.

10 Claims, 12 Drawing Sheets

HEIGHT-ADJUSTABLE CAR CURTAIN

FIELD OF THE INVENTION

The present invention relates to a height-adjustable car curtain, particularly to a height-adjustable car curtain which fits into all types of car windows by suitable cutting and bending, without being tangled up with cords.

DESCRIPTION OF RELATED ART

For preventing the interior of cars from heating up due to incident sunlight and from being exposed to unwanted glances from outside, car windows are often fitted with protective devices.

Protective devices that appeared first are stiff shields which protected against sunlight, but due to their size are inconvenient to handle and to store away. Later, car curtains were brought to the market which allow to be folded up, mostly by roll systems driven by springs. This type of car curtains is easy to use, but requires manual action for folding and unfolding, which is inconvenient for the driver.

More recently, car curtains with electrically driven winding devices have appeared on the market in increasing numbers. Therein, a motor drives a shaft in a rotating movement for winding and unwinding a curtain, allowing the driver readily to control exposure to sunlight.

However, many types of cars in many sizes are sold, so that a given conventional car curtain does not fit to every car window, making selecting a suitable car curtain difficult. Furthermore, cords used in conventional car curtains easily get tangled up, causing great hassle.

SUMMARY OF THE INVENTION

It is therefore an object of the present invention to provide a height-adjustable car curtain which fits into all types of car windows.

Another object of the present invention is to provide a height-adjustable car curtain which has cords that will not get tangled.

A further object of the present invention is to provide a height-adjustable car curtain which has an unfolding movement that automatically stops when an obstacle is encountered.

The present invention can be more fully understood by reference to the following description and accompanying drawings.

DETAILED DESCRIPTION OF THE PREFERRED EMBODIMENT

As shown in FIG. 1, the height-adjustable car curtain of the present invention comprises a curtain 10, made of soft, sun-protecting material; a case 20, shaped like a tube extended along a longitudinal direction and having a first end and a second end, for accommodating the curtain 10 in a folded state; a winding device 30 for winding and unwinding the curtain 10; a leading rod 11, attached to the curtain on a far edge thereof that is parallel to said case 20 and opposite thereto; two guiding rails 40 having lower ends that are attached to the first and second ends of the case 20, respectively, and guiding unfolding and folding movements of the leading rod 11 of the curtain 10; two fastening elements 70, respectively placed on upper ends of the two guiding rails 40 for fastening the two guiding rails 40 on a car window frame.

The leading rod 11 has a length that is equal to the length of the curtain 10 and serves to stiffen the curtain 10 at the far edge thereof. In an unfolded state, the curtain is at a near edge held by the case 20 and at the far edge held by the leading rod 11, forming a stiff plane.

Referring to FIG. 2, the case 20 has a tube-shaped hull 21, extending in the longitudinal direction and surrounding an accommodating space that accommodates the curtain 10, and a shaft 25 parallel to the longitudinal direction. The near edge of the curtain 10 is attached to the shaft 25, so that in the folded state the curtain 10 is wound up around the shaft 25. The hull 21 has a longitudinal opening 22 with a length that is slightly larger than the length of the curtain 10, allowing the curtain 10 to pass through when unwound. A groove 23 extends longitudinally along the hull 21 on a lower side thereof, accommodating two extension rods 24. A shown in FIGS. 1 and 2, the two extension rods 24 are placed on the lower side of the hull 21 in the longitudinal direction, being fixed in adjustable positions by screws 27 that pass through the hull 21. The two extension rods 24 have far ends that carry connecting elements 50 connecting to the guiding rails 40.

Referring to FIG. 4, each of the connecting elements 50 has a joint 53 passed through by an axis 54. A roll 55 surrounds the axis 54. A cord 34 that serves to pull out the curtain 10 is wound around the roll 55.

As shown in FIG. 3, each of the guiding rails 40 is an elongated tube-like body with a rectangular cross-section, surrounding a passageway 42, leaving a longitudinal slit 41. The leading rod 11 is a hollow tube-shaped body, having two ends into each of which a gliding rod 60 is put. Each of the gliding rods 60 is connected with a gliding seat 63. Each of the gliding seats 63 has a bolt 62, put through one of the gliding rods 60 at an end thereof, a connecting section 64, which is oriented perpendicular to the bolt 62 and a gliding plate 65. For each of the gliding seats 63, the connecting section 64 passes through the slit 41, and the gliding plate 65 glides within the passageway 42 of one of the guiding rails 40. Thus the gliding seats 63 are able to move along the guiding rails 40.

The cord 34 is attached to each of the gliding seats 63 and pulled on by the winding device 30, so that each of the gliding seats 60 is pulled on, taking along the gliding rods 60 and the leading rod 11. Each of the guiding rails 40 has a wheel 43 at the upper end thereof, around which the cord 34 runs. The cord 34, having been wound around the roll 55, passes through a hole in the gliding plate 65, runs around the wheel 43 and is attached to the gliding plate 65. Thus, when the cord 34 is pulled on by the winding device 30, each of the gliding seats 63 moves away from the case 20.

The characteristic of the present invention lies in the adaptability thereof to car windows of various widths and heights. Adjusting is done by varying the longitudinal positions of the extension rods 24 and the height and inclination of the guiding rails 40. As shown in FIG. 4, the connecting elements 50 are attached to the far ends of the extension rods 24. Each of the connecting elements 50 has a fixed end 51, fastened to the far end of one of the extension rods 24, and an insertion end 52, inserted into the lower end of one of the guiding rails 40. Thus each of the guiding rails 40 is connected with one of the connecting elements 50.

The characteristic of each of the connecting elements 50 is that between the fixed end 51 and the insertion end 52 a curved section 53, made of elastic metal, is inserted. The curved section 53 connects the fixed end 51 and the insertion end 52 at a connecting angle, which, due to the elasticity of the curved section 53 is variable around 90 degrees. Thus the rails 40 having been put on the insertion ends 52, are adaptable to inclined car window frames.

Referring to FIG. 5, the guiding rails 40 are not fixed on the insertion ends 52. Therefore, the guiding rails 40 allow to be separated from the connecting elements 50 and put back in a parallel orientation. Furthermore, the guiding rails 40 are made of material that is easily cut, like plastics or an aluminum alloy, allowing to cut the guiding rails 40 suitably to adapt to various sizes of car windows.

Referring to FIG. 6, each of the two fastening elements 70 on the upper ends of the guiding rails 40 has an elastic plate 71 and a gliding part 72, which is inserted into one of the gliding rails 40 at a suitable position. For mounting the fastening elements 70, the elastic plate 71 of each of the two fastening elements 70 is inserted into a gap between a car glass window 73 and a frame plate 74 and held there by elasticity. Thus the guiding rails 40 are fixed on two sides of the car glass window 73.

For opening the curtain 10, the winding device 30 pulls on the cord 34, which in turn pulls up the gliding seat 63 on the far ends of the gliding rods 60 on the leading rod 11, so that the leading rod 11 and the curtain 10 are drawn up, guided by the guiding rails 40, to an upper edge of the car glass window 73. For lowering the curtain 10, the winding device is operated in reverse direction, gradually releasing the cord 34, so that the curtain descends, driven by a spring on the shaft 25 (not shown). Therefore, after the cord 34 has released the curtain 10, the curtain 10 is wound on the shaft 25 and thus accommodated in the case 20.

As the above explanation shows, by adjusting the connecting angles of the connecting elements 50 and the lengths of the guiding rails 40, the present invention allows to be adapted to car windows of various sizes. Thus design and production costs are lowered and the inconvenience of appropriate choosing is avoided, particularly for automatic installation.

Referring to FIG. 7, the winding device 30 comprises: a casing 31; a motor 32 inside the casing 31; a winding wheel 33, on which the cord 34 is wound; a worm 35, driven by the motor 32; a gear wheel 36, coaxially fixed to the winding wheel 33 and engaging with the worm 35 to be driven in a rotating movement for winding and unwinding the cord 34; a control system 80 for controlling the motor 32; and a control circuit 90.

The control system 80 comprises: a lever arm 81, having an axis 82 at a central position; wheels 83, 84 over which the cord 34 runs; and a microswitch 85, mounted on the lever arm 81 close to the wheel 83. The cord 34 runs over the wheels 83 and 84 in a Z-like pattern, so that tension in the cord 34 causes the wheels 83, 84 to turn the lever arm 81, so that the microswitch 85 stays closed, and the motor 32 remains switched on.

As shown in FIGS. 7–10, the winding device 30 is mounted at a lower side of the car glass window, having a front end with two elongated holes 37 to be fastened on the case 20, adapting an angle between the winding device 30 and the case 20 to various shapes of car windows. The cord has one end wound on the winding wheel 33. Free ends of the cord 34 are then led over the wheel 83 and 84 in a Z-like shape, run over a supporting wheel 86, two wheels 26 inside the groove 23, the rolls 55, the wheels 43 at the upper end of the guiding rails 40 and are respectively fixed on the gliding seat 63.

For unfolding the curtain 10, the motor 32 is operated, with the worm 35 driving the gear wheel 36, taking along the winding wheel 33, so that tension in the cord 34 is generated. Increased tension of the cord 34 causes the wheels 83, 84 to turn the lever arm 81, so that the microswitch 85 stays closed, and the motor 32 remains switched on. The gliding seats 63 are pulled up by the cord inside each of the slits 41 of the guiding rails 40, taking along the gliding rods 60 and the leading rod 11, so that finally the curtain 10 is pulled up.

On the other hand, for folding the curtain 10, the motor 32 is operated in reverse direction, so that the winding wheel 33 unwinds the cord 34, causing the gliding seats 63 to move down inside each of the slits 41 of the guiding rails 40, so that the curtain 10 is wound up inside the case 20. After the curtain 10 has been completely wound up, tension of the cord 34 ceases, so that the lever arm 81 is no longer pressed on, and an elastic force of the microswitch 85 causes microswitch 85 to open, resulting in the motor 32 to stop operation and consequently in the winding wheel 33 to stop turning.

As the above explanation shows, when tension of the cord 34 is smaller than elastic force of the microswitch 85, the microswitch immediately opens, the motor 32 ceases operation, and the winding wheel 33 stops. Thus the cord 34 will not become tangled due to excess movement.

Referring to FIG. 11, the control circuit 90 comprises: a power circuit 91, providing power for the control circuit 90; a driver circuit 92 for controlling operation of the motor 32; a sensor circuit 93, detecting a working current through the motor 32; a main control circuit 94, controlling input and output signals; a timer circuit 95, generating signals according to elapsed time and transmitting these to the main control circuit 94; a high-frequency receiver 96, receiving remote signals and transmitting these to the main control circuit 94; a memory device 97, storing parameters of the main control circuit 94; and an alarm circuit 98, issuing an alarm upon receiving a signal from the main control circuit 94.

The control circuit 90 is controlled via cables or by remote control.

Control by cables works as follows: A manually operated switch, a power source and signal cables are used. When the manually operated switch is in an UP position, the motor 32 rotates in a positive direction, pulling back the cord 34 and unfolding the curtain 10. At this time, the sensor circuit 93 continuously detects changes of the working current through the motor 32, and the timer circuit 95 monitors elapsed time. When the curtain is completely unfolded, the winding wheel 33 does not turn any longer, and the working current through the motor 32 increases rapidly. Then, without the timer circuit 95 having detected a preset time interval, the main control circuit 94 issues a signal to the driver circuit 92, causing the driver circuit 92 to switch off the motor 32. If the sensor circuit 93 has not yet detected a rapid increase of the working current through the motor 32, but the preset time interval is over, as monitored by the timer circuit 95, the main control circuit 94 also issues a signal to the driver circuit 92, causing the driver circuit 92 to switch off the motor 32, and further sends a signal to the alarm circuit 98, causing the alarm circuit 98 to issue an alarm. When the manually operated switch is in a DOWN position, the motor 32 operates in reverse direction, releasing the cord 34. This operation is similar to the operation in positive direction and needs no further detailed explanation.

If during the movements of the motor 32 and the winding wheel 33, with less than 90% of the preset time interval having elapsed, an obstacle prevents further unfolding or folding of the curtain 10, the sensor circuit 93 detects an overly high working current through the motor 32 and sends a signal to the main control circuit 94. The main control circuit 94 then causes the driver circuit 92 to stop the motor 32 and reverse operation thereof, so that the curtain 10 is moved back to a previous, completely folded or unfolded state, preventing the leading rod 11 to become blocked by an obstacle.

Control by remote control works as follows: When a remote control device (not shown) sends an UP or DOWN signal, the high-frequency receiver 96 transmits the signal to the main control circuit 94, and the main control circuit 94 accordingly controls the driver circuit 92 to operate the motor 32. The movements of the motor 32 in positive and reverse directions as well as during encountering of an obstacle are the same as under control via a cable and need no further explanation.

Referring to FIG. 12, in an embodiment of the present invention, timer elements J1, J2 are provided for time-controlled switching on and off of the motor 32. The timer elements J1, J2 work in a predetermined manner. If the timer elements J1, J2 are grounded, the preset time interval for operation of the motor 32 is 3 seconds. If the timer element J1 is connected with +5V and J2 is grounded, the preset time interval is 6 seconds. If J1 is grounded and J2 is connected with +5V, the preset time interval is 9 seconds. Finally, if both J1 and J2 are connected with +5V, the preset time interval is 12 seconds.

Control via cable works as follows: When the manually operated switch is in the UP position, due to rotation of the motor 32 in positive direction, the curtain will be completely unfolded. If the preset time interval has not been reached, the motor 32, being mechanically blocked, has a relatively high working current. Then a voltage stabilizer U3 and a peripheral sensor detect the changed working current through the motor 32 and thereupon send a pulse to the main controller U2. The main controller U2 sends a LO output signal, stopping the motor 32.

When the manually operated switch is in the DOWN position, the motor 32 rotates in reverse direction, causing the curtain 10 to be completely folded. At this time, due to the cord 34 becoming slack, the lever arm 81 moves away from the microswitch 85, so that the motor 32 is switched off and stops rotating.

When unfolding or folding of the curtain 10 is blocked by an obstacle, the working current through the motor 32 increases abnormally. Then the stabilizer U3 and a peripheral sensor detect the changed working current through the motor 32 and thereupon send a pulse to the main controller U2. The main controller U2 sends an output signal to the transistor Q1, stopping the motor 32. At this moment, the transistor Q2 switches on, causing the motor 32 to be supplied with current in reverse direction, so that the curtain 10 moves back to a previous state and will not be blocked.

The motor 32 causes the curtain 10 to be unfolded and folded in a certain time period, while monitoring the current through the motor 32 for an unusual increase. Thereby a great problem of conventional car curtains is overcome.

The control circuit 90 monitors elapsed time as well as working current through the motor 32, so that a protecting microswitch is not needed. If, before 90% of the preset time interval have passed, the working current changes abnormally, the motor 32 is operated in reverse direction and an alarm is issued.

When the present invention is controlled by a remote control device, a learning function is used, which works as follows: When the switches S1 and S2, as shown in FIG. 12, are closed and a signal from the remote control device is received by an RF module, a signal to the main controller U2 is generated, which is decoded and stored in a memory chip U1 in a learning mode.

When the switches S1 and S2, as shown in FIG. 12, are grounded and an UP signal from the remote control device is received by the RF module, the main controller U2, according to the stored code sends a signal to the base of the transistor Q1, switching on the transistor Q1, so that the motor 32 is operated in positive direction, unfolding the curtain 10. If a DOWN signal from the remote control device is received by the RF module, the main controller U2, according to the stored code sends a signal to the base of the transistor Q1, switching on the transistor Q2, so that the motor 32 is operated in reverse direction, folding the curtain 10.

By the combined operation of the control circuit 90, well-defined and precise control of the motor 32 is achieved and damaging thereof due to too high a working current is prevented. Instead, the curtain 10 is moved back to a previous state and an alarm is issued.

While the invention has been described with reference to a preferred embodiment thereof, it is to be understood that modifications or variations may be easily made without departing from the spirit of this invention which is defined by the appended claims.

Figure 1:
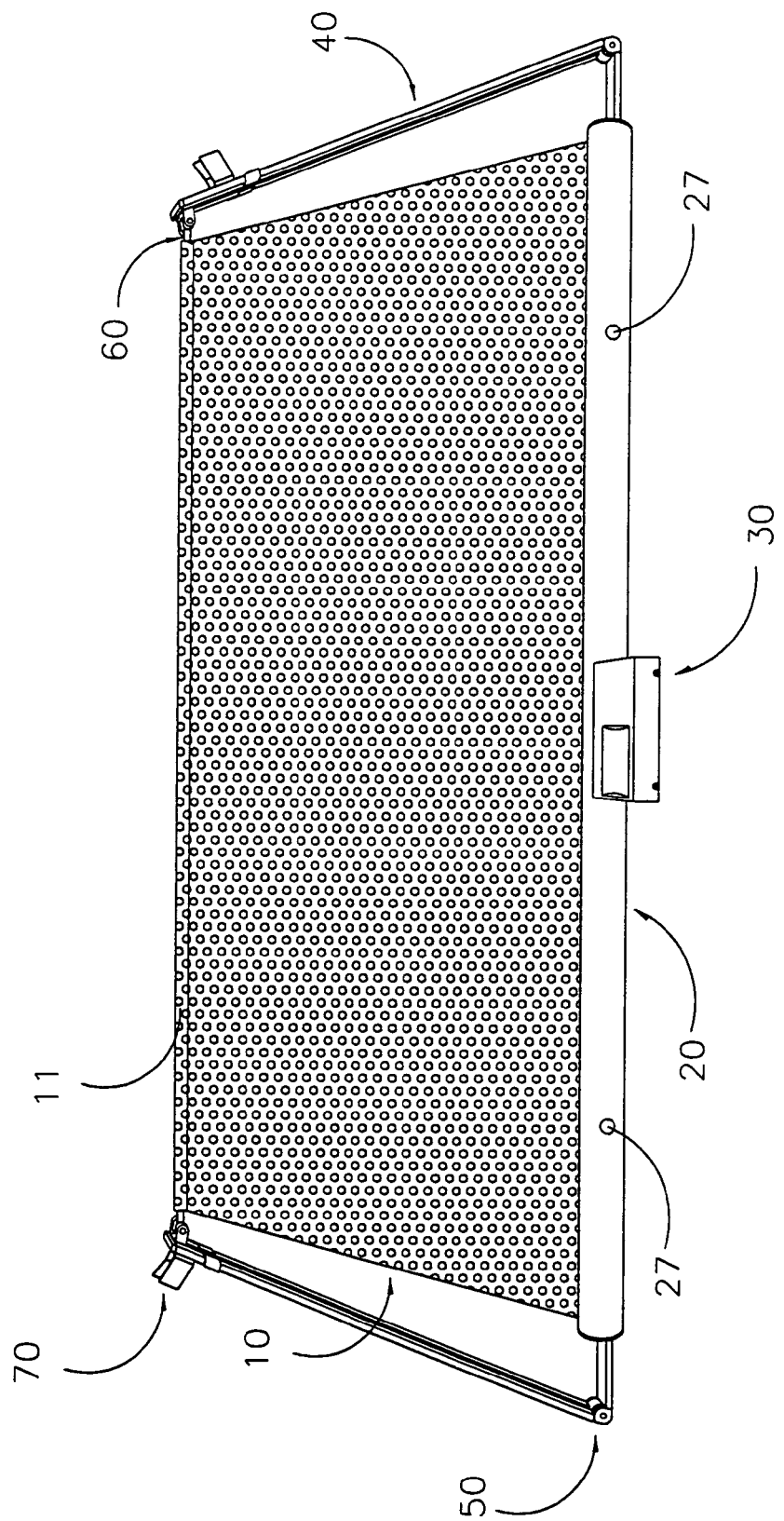
FIG. 1 is a perspective view of the height-adjustable car curtain of the present invention.
Figure 2:
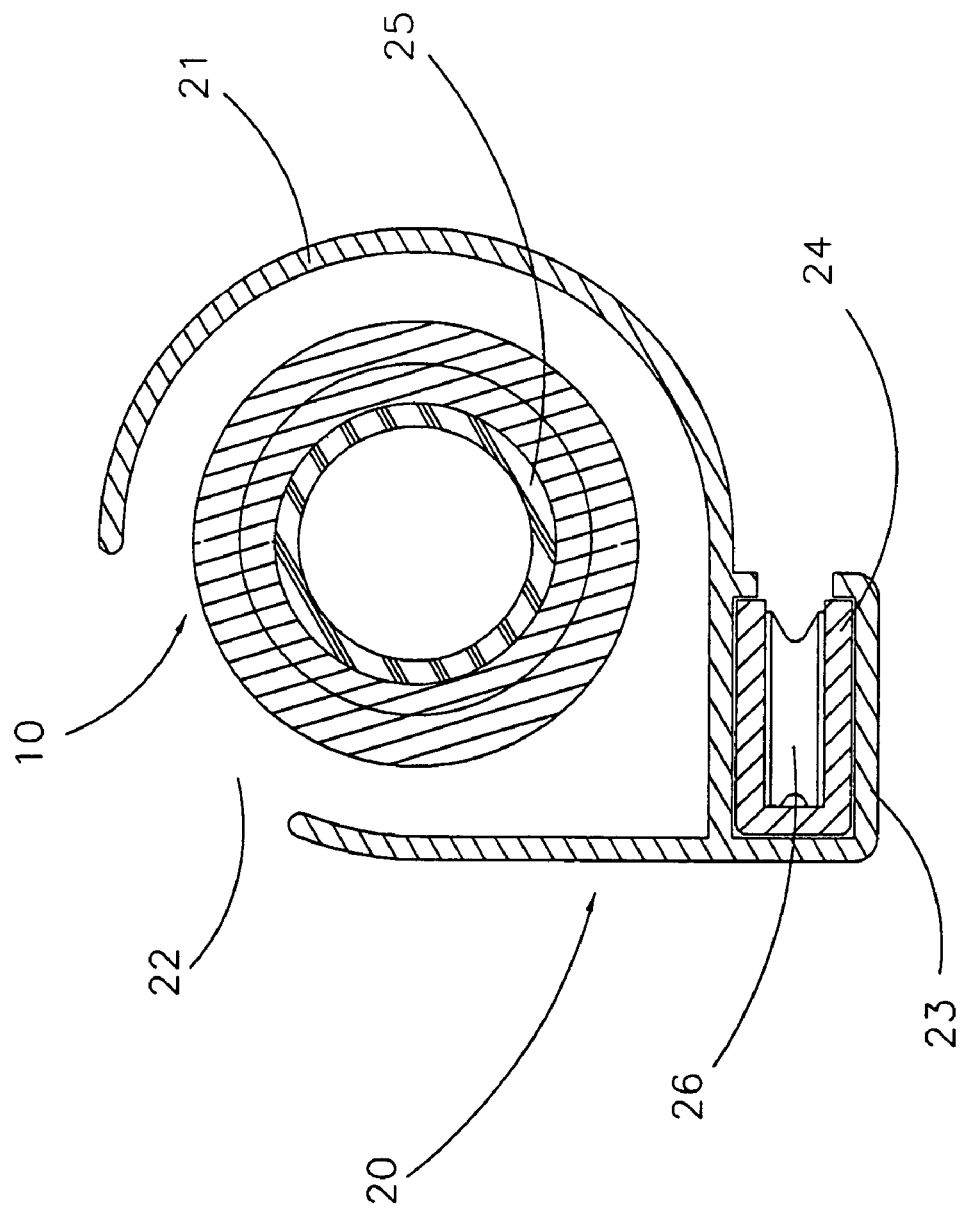
FIG. 2 is a cross-sectional view of the case of the present invention.
Figure 3:
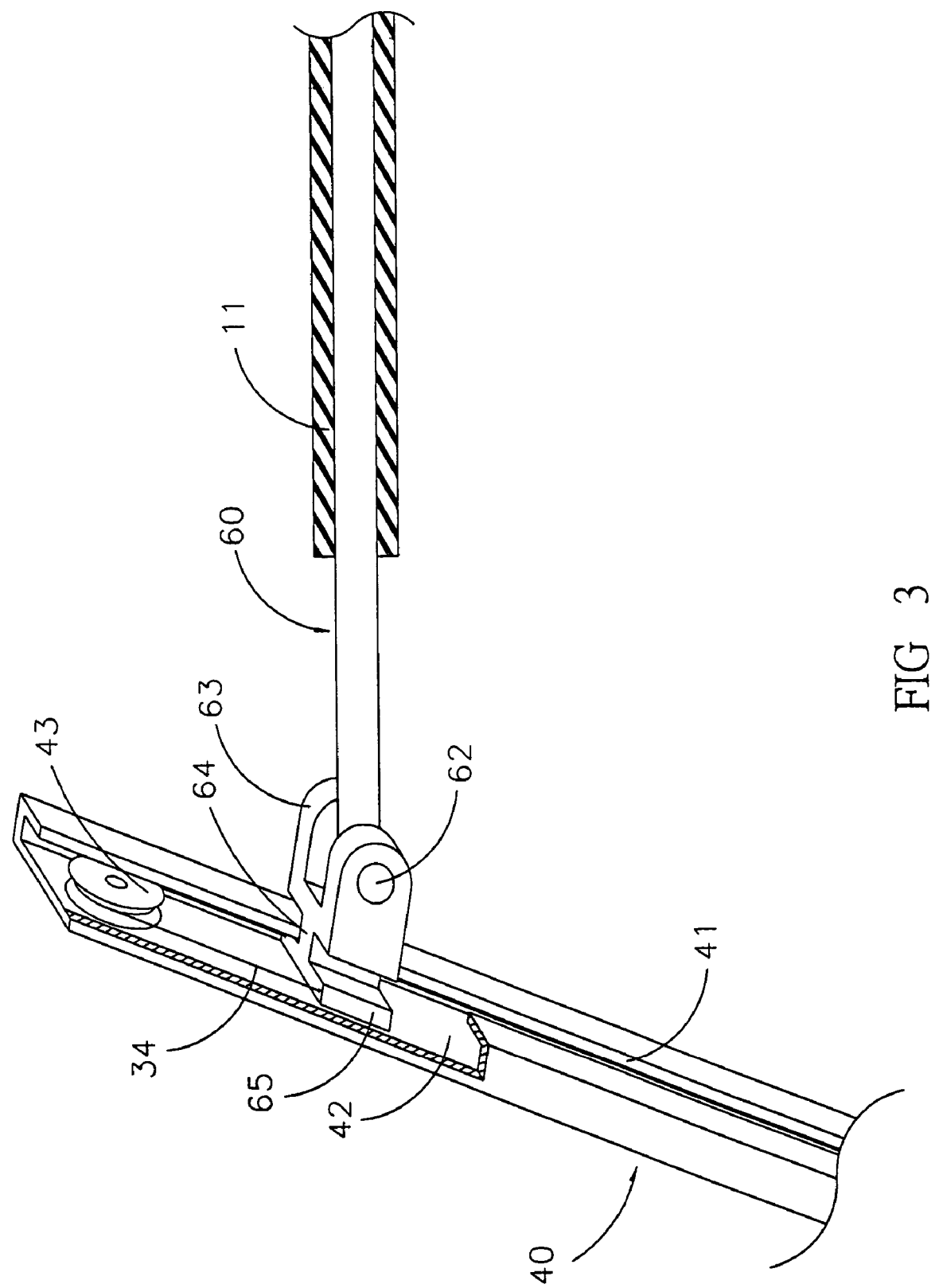
FIG. 3 is an enlarged perspective view of one of the guiding rails of the present invention.
Figure 4:
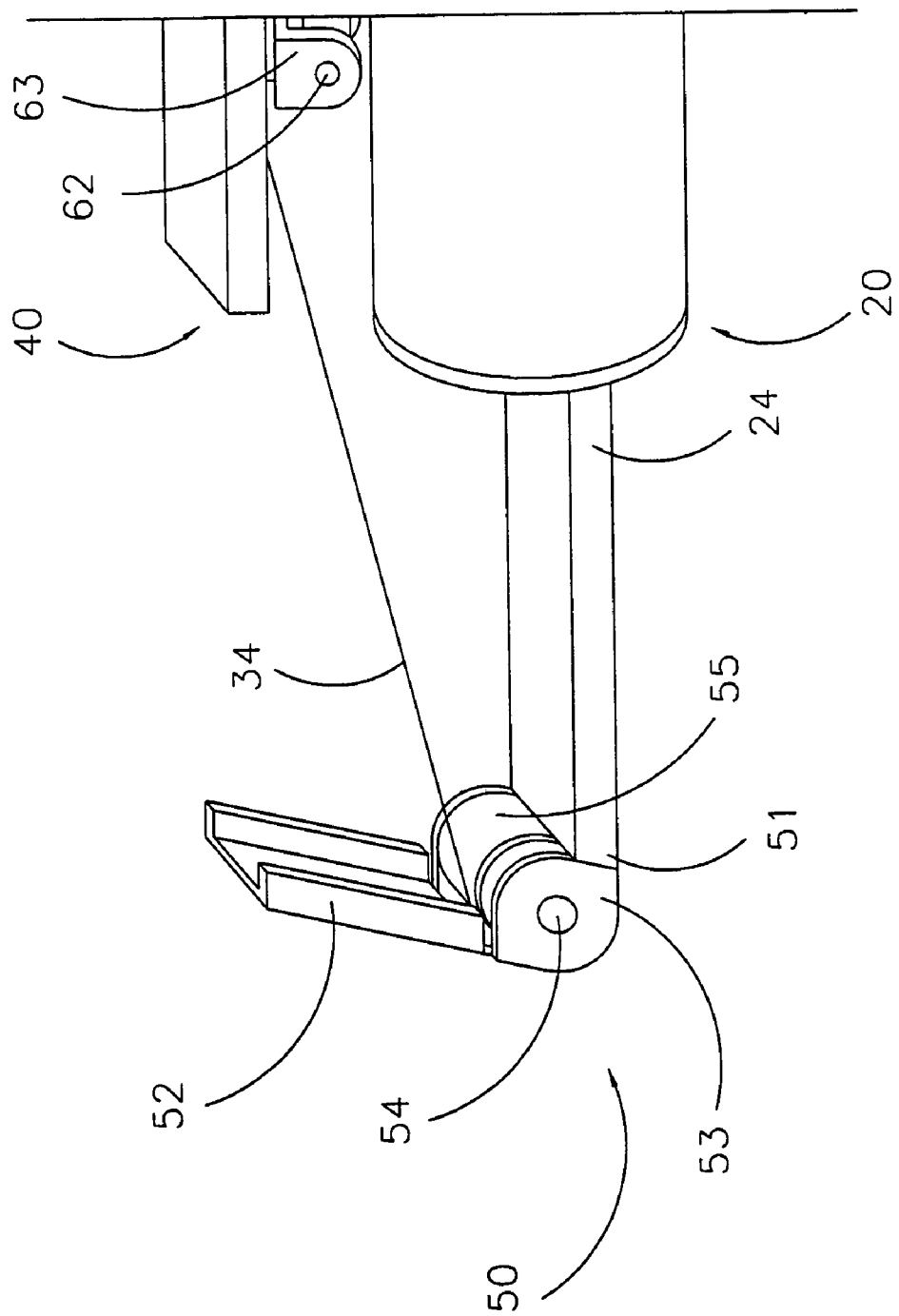
FIG. 4 is a perspective view of one of the connecting elements of the present invention.
Figure 5:
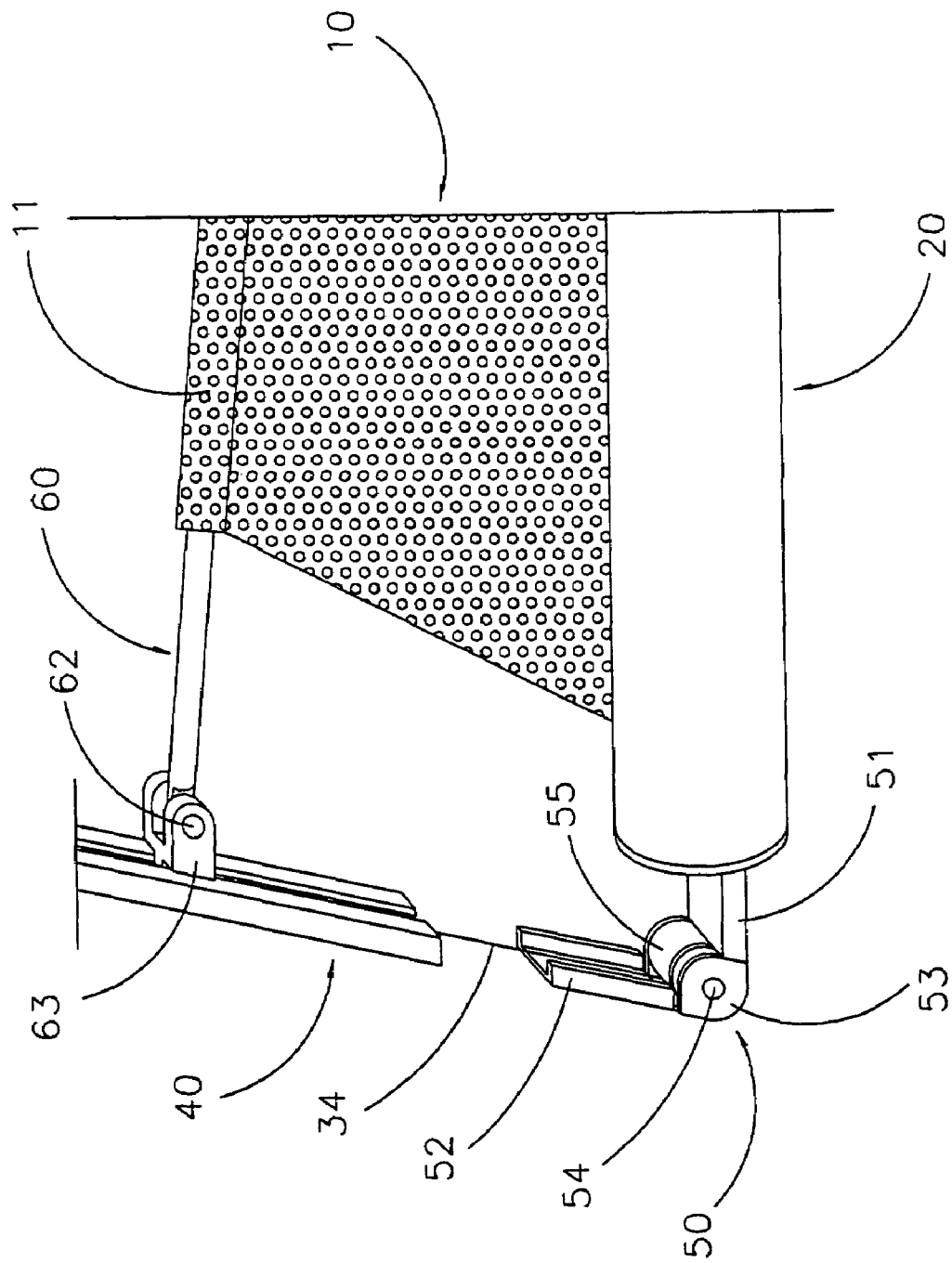
FIG. 5 is an enlarged perspective view of assembling one of the guiding rails and one of the connecting elements of the present invention.
Figure 6:
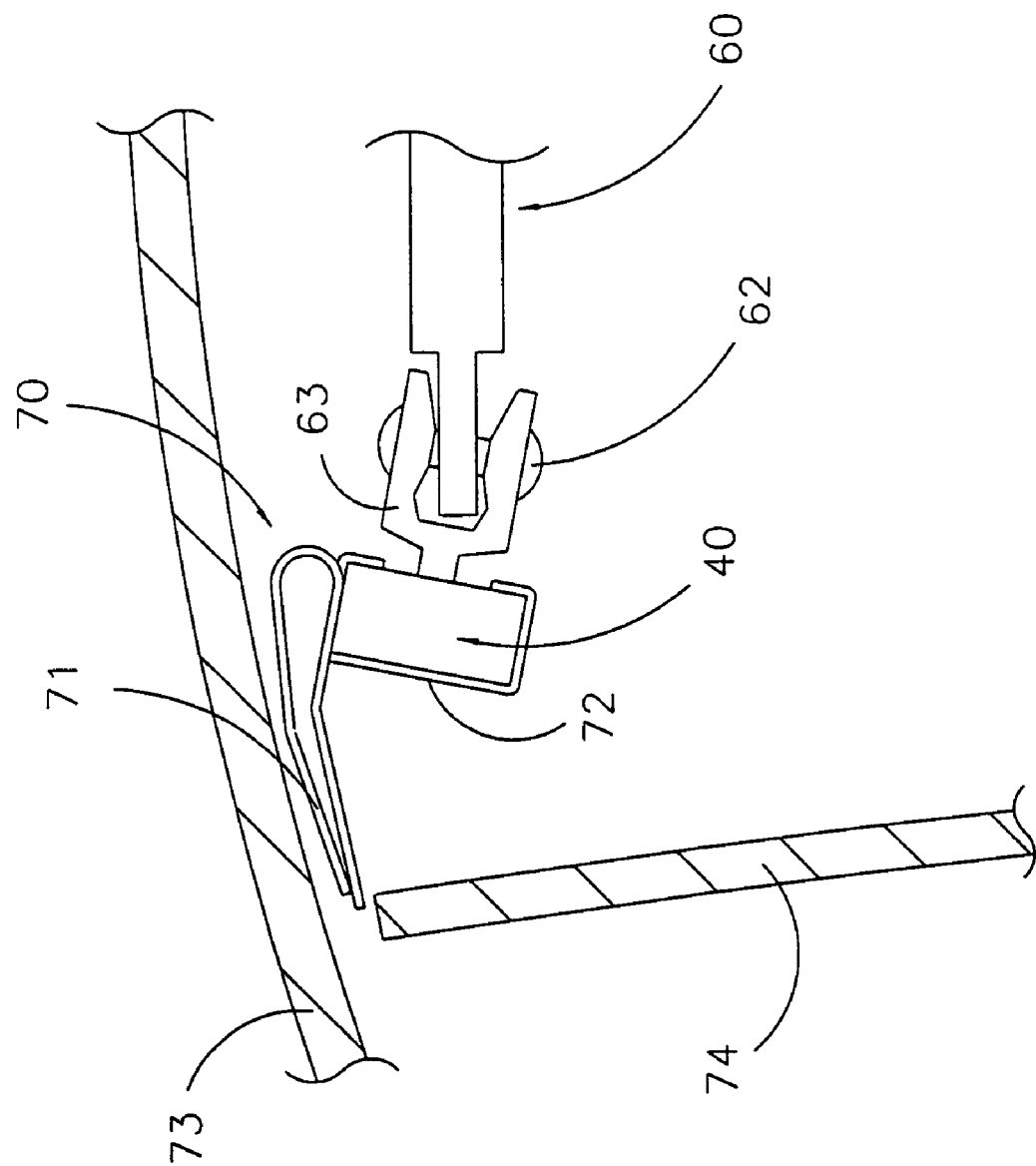
FIG. 6 is a top view of one of the fastening elements of the present invention.
Figure 7:
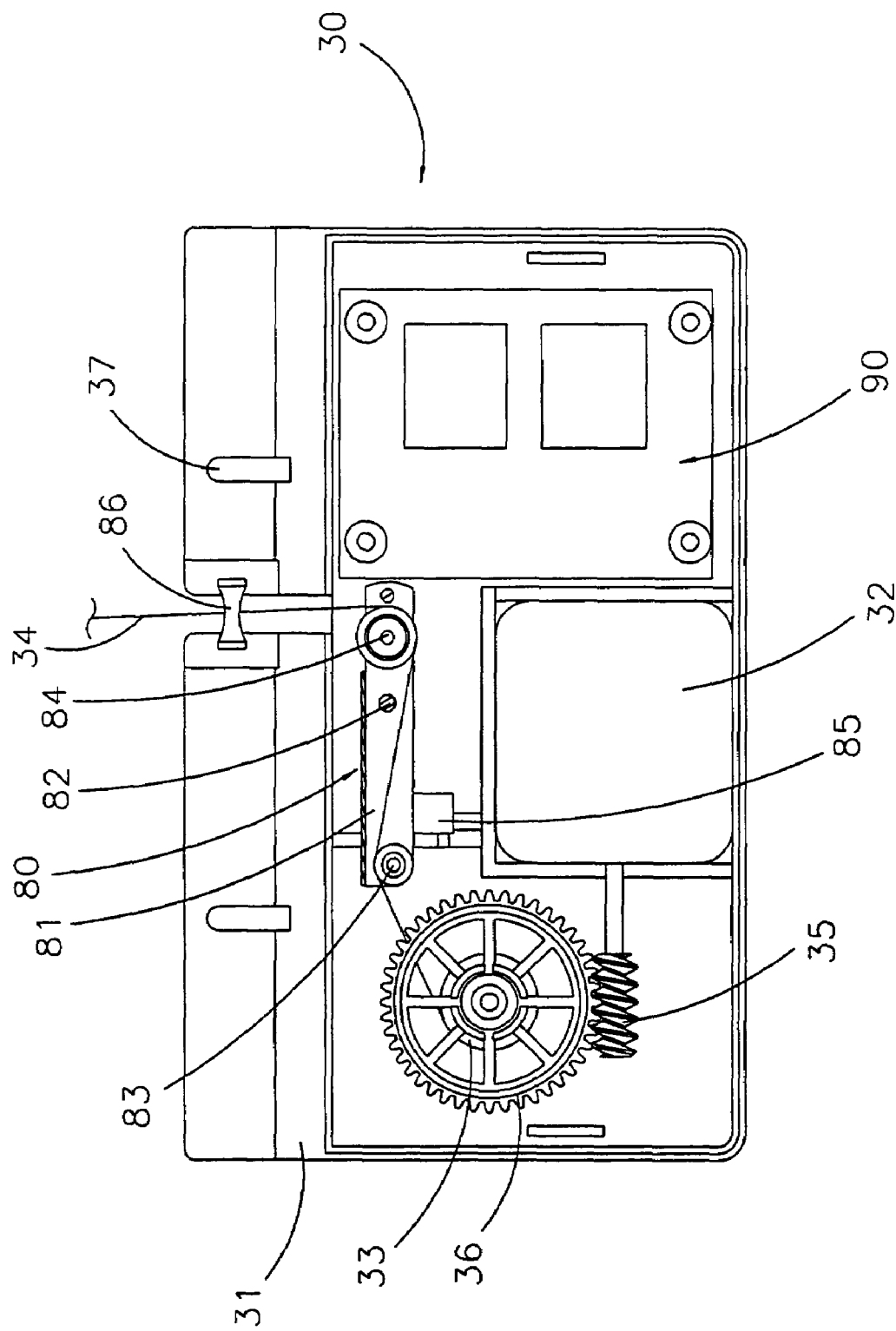
FIG. 7 is a schematic illustration of the winding device of the present invention.
Figure 8:
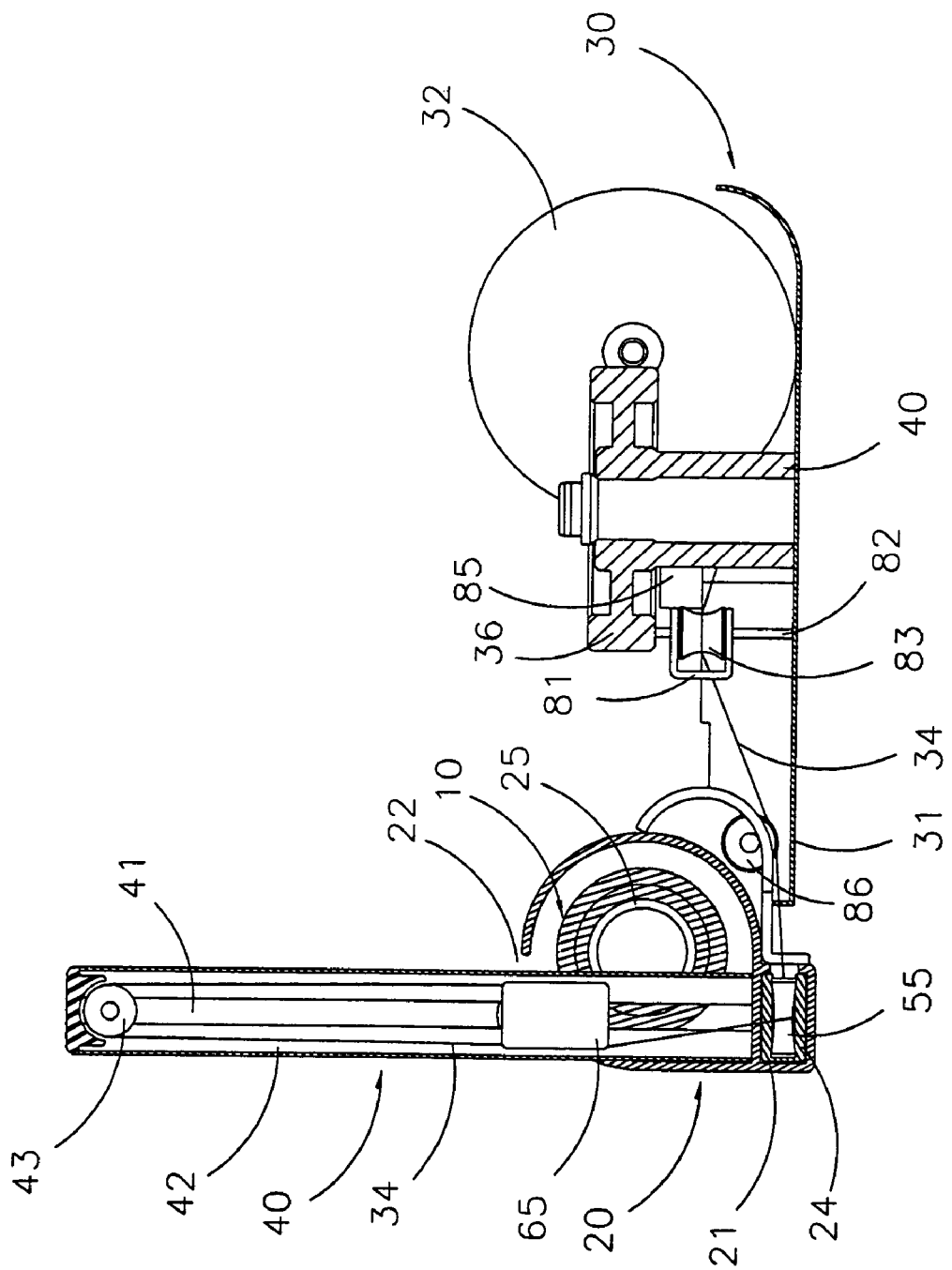
FIG. 8 is a schematic illustration of winding up the cord of the present invention.
Figure 9:
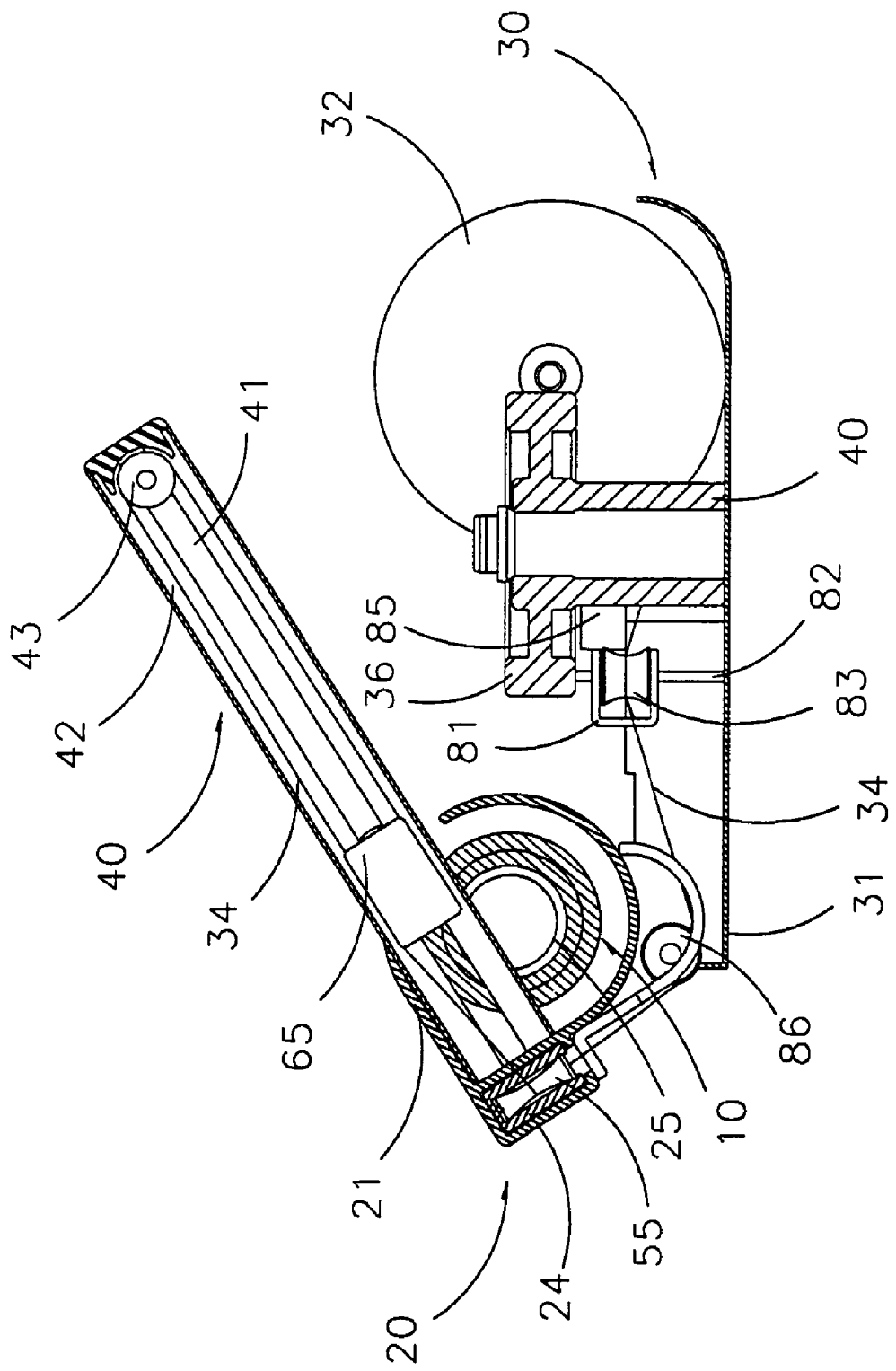
FIG. 9 is a schematic illustration of adjusting the inclination angle of one of the guiding rails of the present invention.
Figure 10:
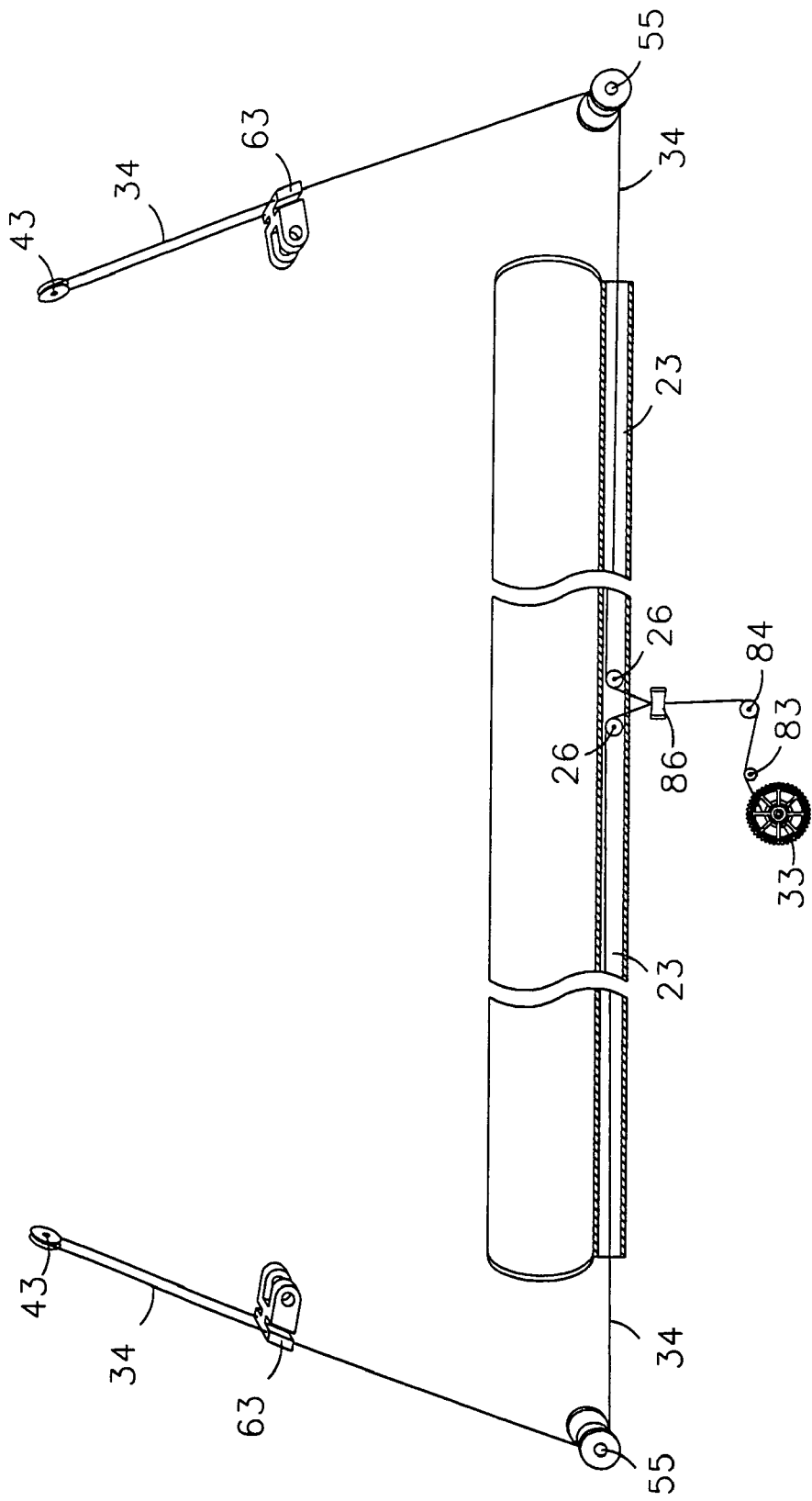
FIG. 10 is a schematic illustration of routing of the cord of the present invention.
Figure 11:
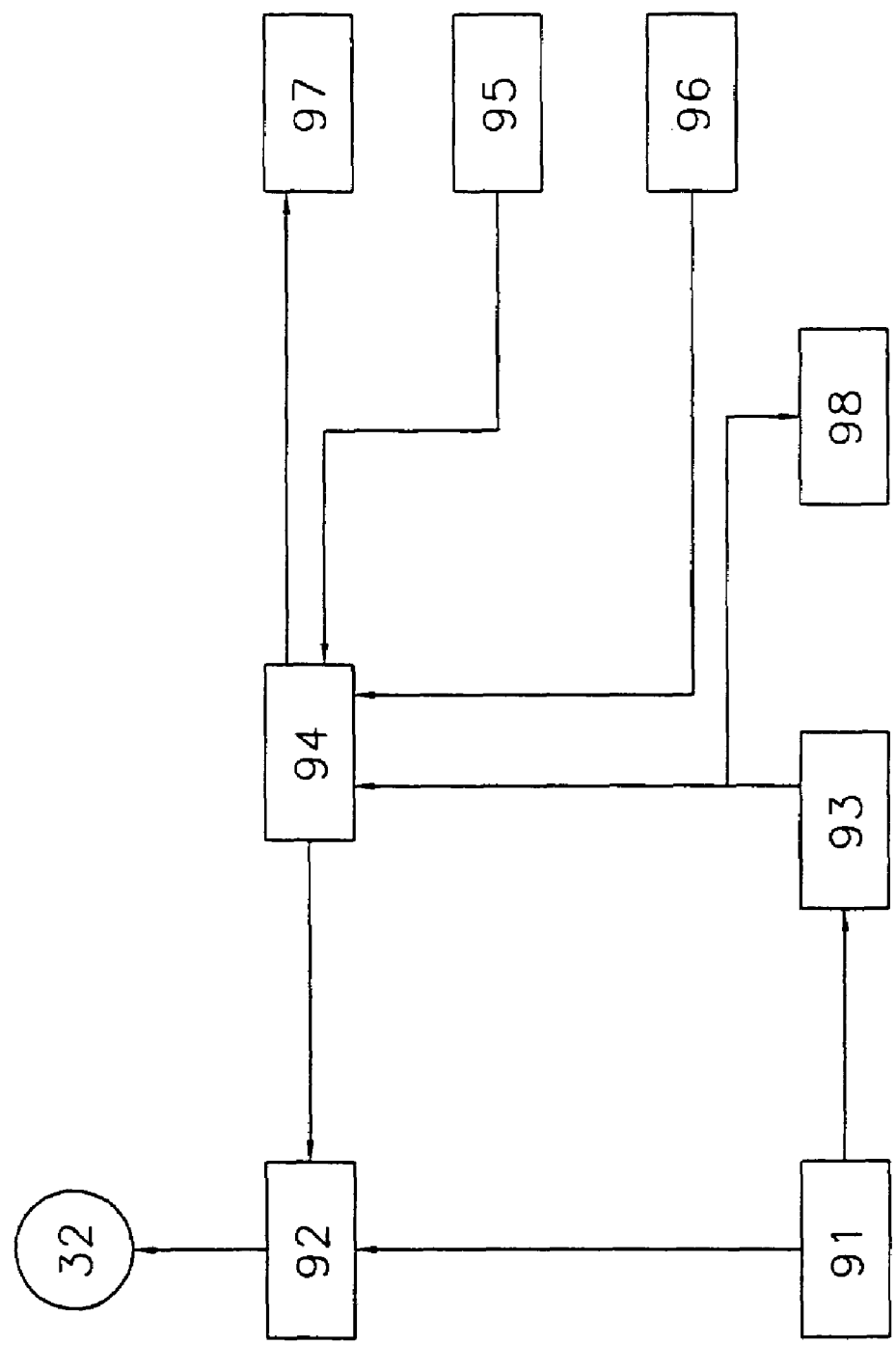
FIG. 11 is a block diagram of the control circuit of the present invention.
Figure 12:
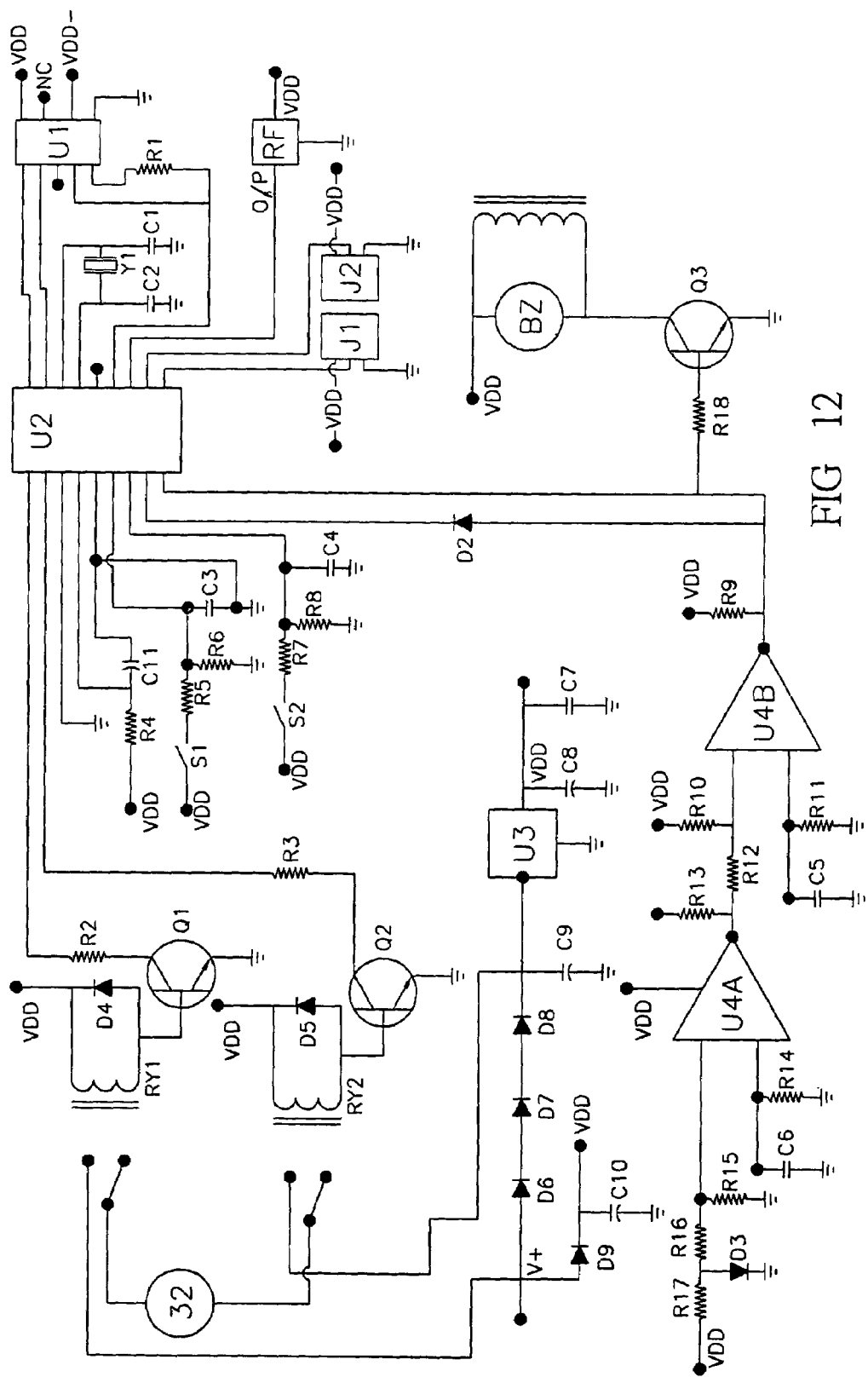
FIG. 12 is a circuit diagram of the control circuit of the present invention.

What is claimed is:

1. A height-adjustable car curtain, comprising:
   a curtain, made of soft, sun-protective material;
   a generally cylindrical case, for housing said curtain in a folded state, having an opening in a longitudinal direction allowing said curtain to pass through;
   a winding device for unfolding and folding said curtain;
   a leading rod, attached to a far edge of said curtain;
   two guiding rails, at lower ends thereof connected with said two ends of said case, respectively, guiding said leading rod when said curtain is unfolded and folded;
   a cord, having an inner end inside said winding device and outer ends that are led through said case and said guiding rails and are connected with said leading rod for controlling unfolding and folding movements of said leading rod; and two connecting elements, each of said two connecting elements being connected to said case and to one of said guiding rails and having a roller over which one of said free ends of said cord is led, and a joint that allows a user to adjust an inclination angle of said guiding rails relative to said case so that a shape of said curtain conforms to different shapes of car windows.

2. The height-adjustable car curtain according to claim 1, wherein said case has a lower side with a groove housing two extension rods which are respectively connected with said two connecting elements, allowing to adjust a distance between said two guiding rails for adapting to various widths of car windows.

3. The height-adjustable car curtain according to claim 1, wherein said leading rod has two ends, each of which carrying a gliding rod having a far end, to which a gliding seat is hingedly connected, gliding inside one of said guiding rails.

4. The height-adjustable car curtain according to claim 1, wherein each of said guiding rails has an upper end with a wheel, over which one of said outer ends of said cord is led to minimize friction.

5. The height-adjustable car curtain according to claim 3, wherein each of said guiding rails has an inner passageway and a longitudinal slit, accommodating a gliding plate of said gliding seat.

6. The height-adjustable car curtain according to claim 1, wherein to each of said guiding rails on an upper end thereof a fastening element is attached.

7. The height-adjustable car curtain according to claim 6, wherein for each of said guiding rails said fastening element further comprises a gliding part and an elastic plate on said gliding part.

8. The height-adjustable car curtain according to claim 1, wherein for each of said connecting elements said roller is set on an axis mounted on said joint.

9. The height-adjustable car curtain according to claim 1, wherein each of said connecting elements has an insertion end, which is put into one of said guiding rails.

10. The height-adjustable car curtain according to claim 2, wherein each of said connecting elements has a fixed end, which is fastened to one of said extension rods.

* * * * *